Dec. 30, 1969                S. C. KILLIAN                 3,487,158
      POWER LINE SUPPORT SYSTEM USING BUSHING INSULATORS FOR
                     NARROW RIGHT-OF-WAY
Filed May 1, 1968                                  2 Sheets-Sheet 1
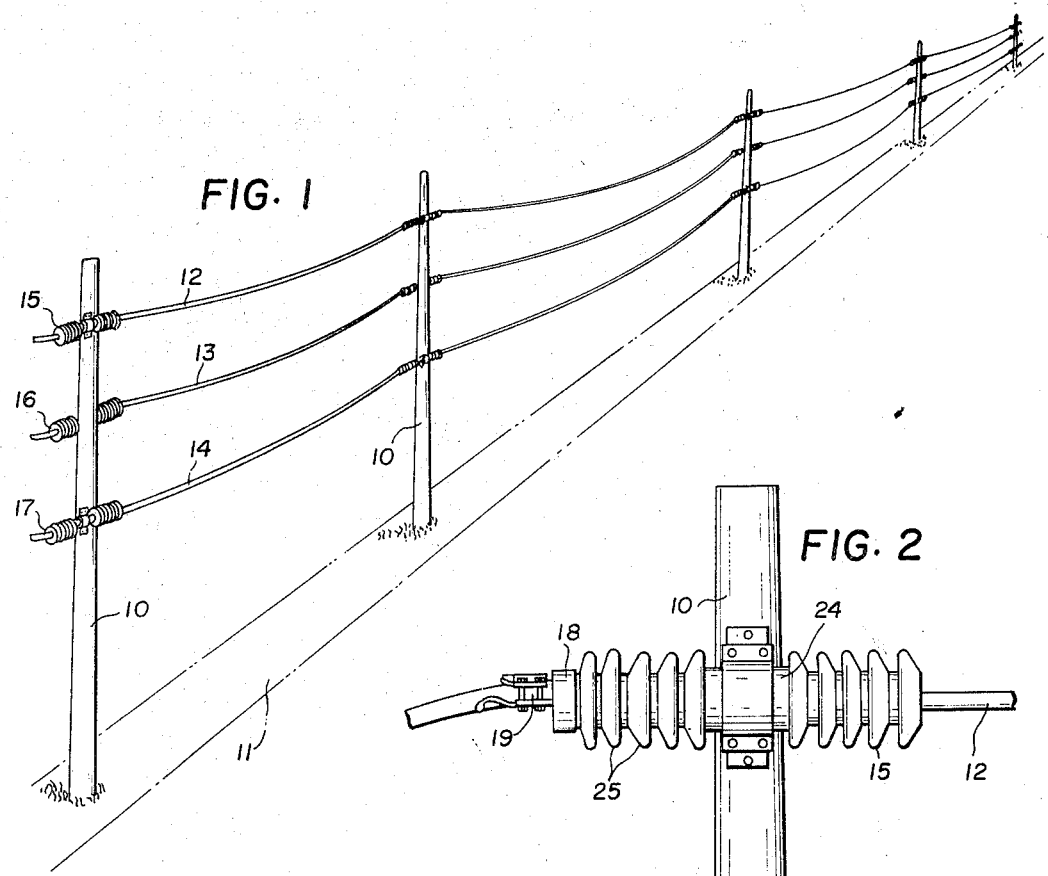
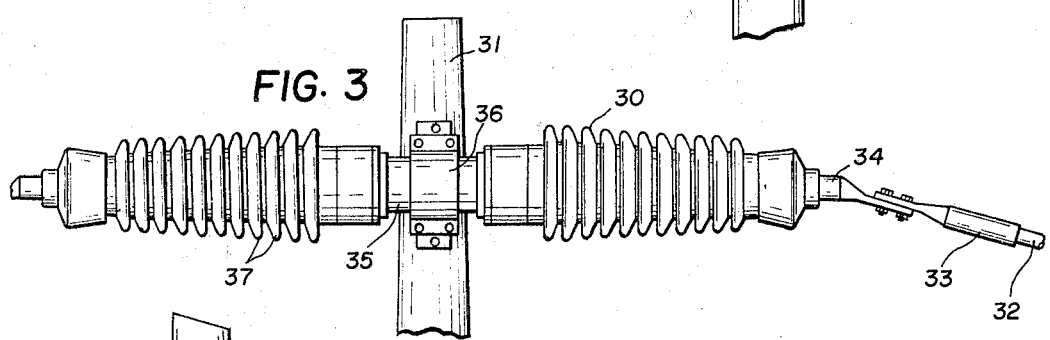
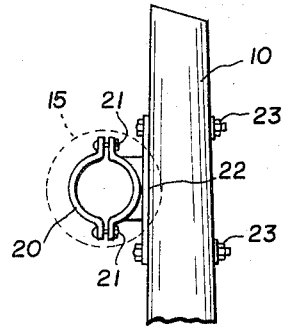
INVENTOR.
STANLEY C. KILLIAN
ATTORNEYS Dec. 30, 1969  S. C. KILLIAN  3,487,158
POWER LINE SUPPORT SYSTEM USING BUSHING INSULATORS FOR
NARROW RIGHT-OF-WAY
Filed May 1, 1968  2 Sheets-Sheet 2

INVENTOR.
STANLEY C. KILLIAN
BY Cumpston, Shaw
& Stephens
ATTORNEYS

United States Patent Office 3,487,158
Patented Dec. 30, 1969

3,487,158
POWER LINE SUPPORT SYSTEM USING BUSHING INSULATORS FOR NARROW RIGHT-OF-WAY
Stanley C. Killian, Le Roy, N.Y., assignor, by mesne assignments, to Interpace Corporation, Parsippany, N.J., a corporation of Delaware
Filed May 1, 1968, Ser. No. 725,846
Int. Cl. H02g 7/20
U.S. Cl. 174—43   8 Claims

ABSTRACT OF THE DISCLOSURE

A power line support system is made narrow and neat looking by using insulator bushings secured to poles to extend away from each side of the pole with conductors suspended between the poles and secured to the bushings. Either hollow, through bushings or sealed, fixed conductor bushings can be adapted to such a system.

---

This invention relates to a power line support system, and more particularly to a power line support system using bushing type insulators to achieve a neat appearance and occupy a narrow right-of-way.

Conventional power line support systems are well-developed and adequate for most purposes. However, they have been criticized for an ugly appearance and they requre a right-of-way of substantial width. In circumstances in which an especially neat appearance is required or a right-of-way is prohibitively expensive in conventional widths, another solution must be found.

The objects of the invention include, without limitation:

(a) a power line support system using an unusually narrow right-of-way;

(b) a power line support system that is neat and trim looking and less ugly than conventional power line support systems; and (c) a narrow power line support system that is reliable, serviceable, simple, and easily maintained.

These and other objects of the invention will be apparent hereinafter from the specification which describes the invention, its use, operation and preferred embodiment, from the drawings, which constitute a part of the disclosure, and from the subject matter claimed.

Generally, the inventive power line support system includes a sequence of upright poles, conductors suspended between the poles, bushing-type insulators extending away from the poles in the direction of the conductors, means encircling the mid-sections of the insulators for securing them closely to the poles, and means for securing the conductors to the insulators. The insulators can be either hollow dielectric bodies or sealed, fixed conductor bushings.

In the drawings:

FIG. 1 is a perspective view of a power line support system according to the invention;

FIG. 2 is an elevational view of one preferred form of bushing for use in the inventive system;

FIG. 3 is an elevational view of an alternative preferred form of bushing for use in the inventive system;

FIG. 4 is an elevational view of a clamp for securing bushings to poles in the inventive system;

Figure 7:
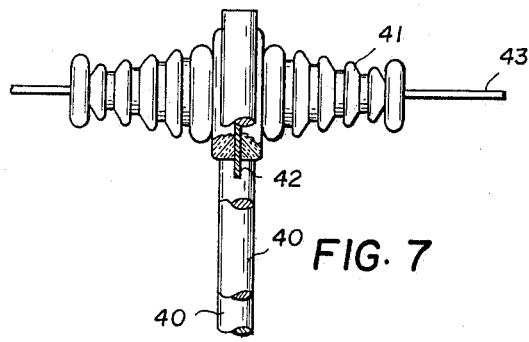
FIG. 7 is a partially cut-a-way elevational view of bushings preferred for the alternatives of FIGS. 5 and 6.

A preferred form of the inventive power line support system is best illustrated in FIG. 1. A sequence of poles 10 formed as upright spars are spaced along a right-of-way 11 and support conductors 12–14 suspended between poles 10. Bushing-type insulators 15–17 are secured to each of the poles 10 to support conductors 12–14 respectively. The top and bottom bushings 15 and 17 are secured on one side of poles 10, and middle bushing 16 is secured on the opposite side of poles 10. Bushings 15–17 extend outward on each side of poles 10 in the direction of conductors 12–14.

The details of bushings 15–17 are best shown in FIG. 2 which illustrates bushing 15. The main body of bushing 15 is preferably formed of porcelain with a hollow bore extending throughout its length and through which conductor 12 is threaded. An annular cap 18 is cemented on one end of bushing 15 and includes an integral clamp 19 fastened to conductor 12. Clamp 19 prevents any longitudinal motion of conductor 12 inside bushing 15.

As best shown in FIGS. 2 and 4 a mounting clamp 20 surrounds the cylindrical mid-section 24 of bushing 15 in a grip secured by bolts 21, and clamp 20 includes a plate 22 secured to pole 10 by bolts 23. This fastens the mid-section 24 of bushing 15 closely against pole 10. A number of outdoor petticoats 25 are formed on each side of mid-section 24 so that petticoated lengths of bushing 15 extend away from each side of pole 10.

An alternative bushing insulator 30 for use in the inventive system is illustrated in FIG. 3 as mounted on pole 31. Bushing 30 is sealed at both ends and has a fixed internal conductor (not shown) extending throughout its length, and a line conductor 32 fitted with a terminal piece 33 is bolted to a corresponding terminal piece 34 mounted on the bushing conductor on each end of bushing 30. A span of line conductor 32 of the correct length is fitted between each bushing 30 between poles 31 in an arrangement such as shown in FIG. 1.

The mid-section 35 of bushing 30 is formed as a cylinder and gripped by a clamp 36 that is similar to clamp 20 described above. Outdoor petticoats 37 are formed on each side of the mid-section 35 of bushing 30 so that a petticoated length of bushing 30 extends away from each side of pole 31.

Bushing 30 is formed as a sealed-type of bushing and can be either oil-filled or filled with a gas such as sulphurhexaflouride in a generally known way.

Figure 5:
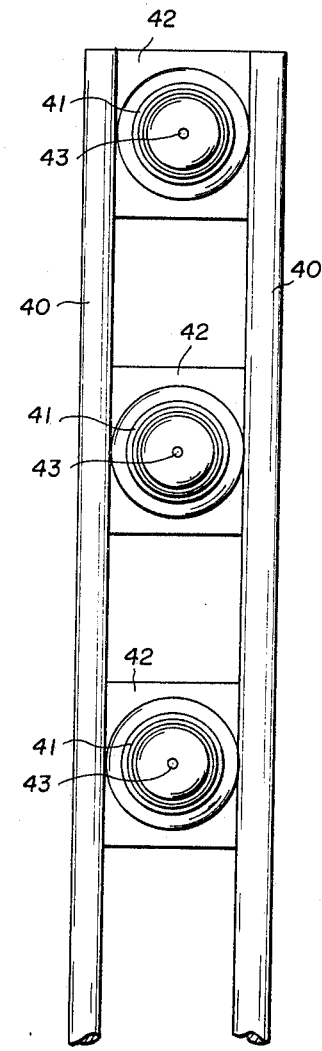
FIG. 5 is an elevational view of an alternative bushing and pole arrangement according to the invention.
Figure 6:
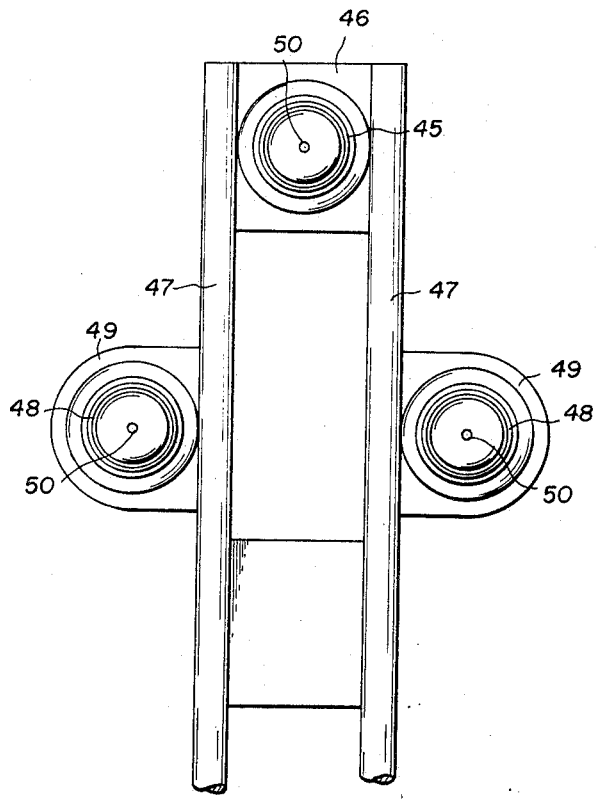
FIG. 6 is an elevational view of an alternative bushing and pole arrangement according to the invention.

Alternative poles and bushing arrangements are shown in FIGS. 5–7. The pole of FIG. 5 is formed as a pair of laterally spaced uprights 40 between which bushings 41 are secured. Each bushing 41 extends through a mounting plate 42 which in turn is secured to uprights 40. Bushings 41 are vertically spaced as illustrated to separate line conductors 43 extending through each bushing 41. Bushings 41 are also illustrated in the partially cut-away view of FIG. 7.

In the alternative arrangement of FIG. 6 a top bushing 45 extending through a mounting plate 46 is secured between laterally spaced uprights 47 forming a power line pole. Below top bushing 45, a pair of bushings 48 extend through side mounting plates 49 that are secured to opposite outer sides of respective uprights 47. Conductors 50 extend through bushings 48 and 45 in a preferred triangular relationship.

Insulator bushings have been generally used in the power line art to provide a conductor path through grounded structures, such as buildings, transformers, walls, etc. At least one end of a bushing used in a conventional way will be protected from the weather, and bushings have generally had different shapes on their respective ends. Standard equipment involving sizeable right-of-way width is available for power line support purposes, so that bushings have not been suggested for a use such as proposed in the inventive system. Furthermore, conventional bushings require adaptation before serving as outdoor power line support elements, and this includes making a clampable mid-section, providing line clamping or fastening means, providing double outdoor petticoated ends, and including a pole-mounting clamp.

In stringing the power line of FIG. 1 using hollow bushings such as shown in FIG. 2, bushings 15–17 are secured to each pole 10, and conductors 12–14 are threaded through the bushings, tensioned, and clamped by clamps 19. The line conductors 32 extending between bushings 30 illustrated in FIG. 3 are cut to fit the span between poles 31, provided with termination pieces, and bolted to the ends of bushings 30. Such methods are more expensive than conventional power line stringing methods, but are worth the extra expense where rights-of-way of conventional width are prohibitively expensive or where the improved appearance of the inventive system is desired.

It will thus be seen that the invention accomplishes its objects in providing a neat looking and narrow power line support system.

I claim:
1. A power line support system comprising:
    (a) a sequence of upright poles;
    (b) conductors suspended between said poles;
    (c) insulator bushings extending away from said poles in the direction of said conductors;
    (d) said bushings being sealed and having fixed internal conductors;
    (e) means encircling and securing the mid-sections of said bushings closely to said poles; and
    (f) said suspended conductors being secured to the ends of said bushings.
2. The system of claim 1 wherein said bushings have outer shells formed of porcelain with outdoor petticoats on each side of said mid-sections.
3. The system of claim 2 wherein said bushings are filled with dielectric material.
4. The system of claim 2 wherein said bushings are oil-filled.
5. The system of claim 2 wherein said bushings are gas-filled.
6. A power line support system comprising:
    (a) a sequence of single, up-right poles;
    (b) conductors suspended between said poles;
    (c) insulator bushings extending away from said poles in the direction of said conductors;
    (d) clamps tightly encircling and holding the mid-sections of said bushings;
    (e) means securing said clamps to said poles to dispose said mid-sections of said bushings alongside said poles;
    (f) said bushings being formed of porcelain and having out-door petticoats on each side of said mid-sections;
    (g) said out-door petticoats being formed as a plurality of annular ridges encircling the main bodies of said bushings and extending radially outward from said main bodies of said bushings; and
    (h) means securing said conductors to said bushings.
7. The system of claim 6 wherein said bushings are hollow, said conductors are threaded through said bushings, and said securing means comprises a clamp secured to one end of each of said bushings for clamping said conductors against movement longitudinally of said bushings.
8. The system of claim 6 wherein three of said bushings are secured in vertically spaced relation on each of said poles, the top and bottom ones of said bushings being on one side of said pole, and the middle one of said bushings being on the opposite side of said pole.

References Cited

UNITED STATES PATENTS

| 496,081 | 4/1893 | Wright | 174—154 |
| 758,986 | 5/1904 | Locke | 174—167 X |
| 823,377 | 6/1906 | Van Every | 174—45 |
| 823,912 | 6/1906 | Biele | 174—167 X |

FOREIGN PATENTS

| 668,040 | 11/1938 | Germany. |
| 751,124 | 6/1956 | Great Britain. |

OTHER REFERENCES

A. B. Chance Co. Advertisement, Electrical World, vol. 163, No. 14, Apr. 5, 1965, pp. 96 and 97.

LARAMIE E. ASKIN, Primary Examiner

U.S. Cl. X.R.

174—31, 149, 167